(12) United States Patent
Sibbald

(10) Patent No.: US 11,741,935 B2
(45) Date of Patent: Aug. 29, 2023

(54) COMMUNICATION APPARATUS WITH AMBIENT NOISE REDUCTION

(71) Applicant: Cirrus Logic International Semiconductor Ltd., Edinburgh (GB)

(72) Inventor: Alastair Sibbald, Cookham (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/748,472

(22) Filed: May 19, 2022

(65) Prior Publication Data

US 2022/0277720 A1  Sep. 1, 2022

Related U.S. Application Data

(63) Continuation of application No. 16/950,318, filed on Nov. 17, 2020, now Pat. No. 11,367,426, which is a
(Continued)

(30) Foreign Application Priority Data

May 9, 2007 (GB) ...................................... 0708860

(51) Int. Cl.
*G10K 11/178* (2006.01)
*H04M 1/60* (2006.01)
(Continued)

(52) U.S. Cl.
CPC .......... *G10K 11/1783* (2018.01); *G10K 11/16* (2013.01); *G10K 11/17821* (2018.01);
(Continued)

(58) Field of Classification Search
CPC ..... G10K 2210/108; G10K 2210/1081; G10K 2210/3033; G10K 2210/3045;
(Continued)

(56) References Cited

U.S. PATENT DOCUMENTS 5,138,664 A * 8/1992 Kimura ............ G10K 11/17823
381/71.13
5,774,562 A   6/1998 Furuya et al.
(Continued)

FOREIGN PATENT DOCUMENTS

EP 0 390 386 A2 10/1990
EP 0 871 312 A1 10/1998
(Continued)

OTHER PUBLICATIONS

BDC Electronic catalog, https://www.bdcelectronic.com/AA_Inglese/AA_PDF_Inglesl/completo.pdf.selected portion, printed Jan. 2007.
(Continued)

*Primary Examiner* — Kile O Blair
(74) *Attorney, Agent, or Firm* — Blank Rome LLP

(57) ABSTRACT

A host device configured to be wirelessly coupled to an accessory device, the host device comprising noise reduction circuitry, wherein, in use of the host device: a signal generated by a microphone of the accessory device in response to ambient noise is supplied to the noise reduction circuitry; the noise reduction circuitry applies a noise reduction transfer function to the signal supplied thereto to generate a noise cancellation signal; and the noise cancellation signal is supplied to at least one loudspeaker of the accessory device; and wherein the noise reduction transfer function applied by the noise reduction circuitry is user selectable or user adjustable.

10 Claims, 7 Drawing Sheets

Related U.S. Application Data continuation of application No. 16/897,466, filed on Jun. 10, 2020, now Pat. No. 10,950,215, which is a continuation of application No. 16/583,882, filed on Sep. 26, 2019, now Pat. No. 10,685,636, which is a continuation of application No. 14/601,854, filed on Jan. 21, 2015, now abandoned, which is a continuation of application No. 12/599,026, filed as application No. PCT/GB2008/001601 on May 8, 2008, now Pat. No. 8,953,814.

(51) Int. Cl.
| | |
|---|---|
| *H04R 1/10* | (2006.01) |
| *G10K 11/16* | (2006.01) |
| *H04R 5/033* | (2006.01) |
| *H04M 1/72412* | (2021.01) |

(52) U.S. Cl.
CPC .. *G10K 11/17857* (2018.01); *G10K 11/17873* (2018.01); *G10K 11/17885* (2018.01); *H04M 1/6066* (2013.01); *H04R 1/1083* (2013.01); *G10K 2210/1081* (2013.01); *H04M 1/72412* (2021.01); *H04R 1/1041* (2013.01); *H04R 5/033* (2013.01); *H04R 2420/05* (2013.01); *H04R 2499/11* (2013.01)

(58) Field of Classification Search
CPC ... G10K 2210/3055; G10K 2210/3214; G10K 2201/30351; G10K 2201/3031
See application file for complete search history.

(56) References Cited

U.S. PATENT DOCUMENTS

| | | |
|---|---|---|
| 5,797,102 A | 8/1998 | Hallikainen |
| 6,016,136 A | 1/2000 | Fado |
| 6,859,538 B1 | 2/2005 | Voltz |
| 6,934,396 B1 | 8/2005 | Leapman |
| 7,031,460 B1 | 4/2006 | Zheng et al. |
| 7,856,240 B2 | 12/2010 | Gunn et al. |
| 8,532,307 B2 | 9/2013 | Derieth |
| 8,625,812 B2 | 1/2014 | Goldstein |
| 2001/0016020 A1 | 8/2001 | Gustafsson et al. |
| 2001/0046304 A1* | 11/2001 | Rast ............... H04R 1/1083 381/26 |
| 2001/0053228 A1 | 12/2001 | Jones |
| 2003/0053646 A1 | 3/2003 | Nielsen et al. |
| 2003/0185403 A1 | 10/2003 | Sibbald |
| 2004/0234084 A1 | 11/2004 | Isberg et al. |
| 2005/0276421 A1 | 12/2005 | Bergeron et al. |
| 2005/0286713 A1 | 12/2005 | Gunn et al. |
| 2006/0013410 A1 | 1/2006 | Wurtz |
| 2006/0046651 A1 | 3/2006 | Hazell et al. |
| 2006/0153400 A1 | 7/2006 | Fujita et al. |
| 2006/0182047 A1 | 8/2006 | Ibe |
| 2008/0025523 A1* | 1/2008 | Miller ............ G10K 11/17855 381/74 |
| 2008/0159555 A1 | 7/2008 | Asada |
| 2009/0061944 A1 | 3/2009 | Simmons |
| 2010/0115149 A1 | 5/2010 | Ewer |

FOREIGN PATENT DOCUMENTS

| | | |
|---|---|---|
| EP | 1 675 366 A1 | 6/2006 |
| JP | 9-331377 A | 12/1997 |
| JP | 10-294989 A | 11/1998 |
| JP | 2000174897 A * | 6/2000 |
| JP | 2001-218299 A | 8/2001 |
| JP | 2002-237870 A | 8/2002 |
| JP | 2006-229545 A | 8/2006 |
| JP | 2006-1309771 A | 11/2006 |
| TW | 200703890 A | 1/2007 |
| TW | 200705951 A | 2/2007 |
| WO | WO 02/082422 A2 | 10/2002 |
| WO | WO 2006/036262 A2 | 4/2006 |
| WO | WO 2006/042540 A1 | 4/2006 |

OTHER PUBLICATIONS

"Enhance music quality by using a headset and a mobile phone", Research Disclosure, Mason Publications, Hampshire, GB, Jan. 7, 2005, ISSN 0374-4353.

* cited by examiner

COMMUNICATION APPARATUS WITH AMBIENT NOISE REDUCTION

CROSS REFERENCE TO RELATED APPLICATION

This is a continuation of Ser. No. 16/950,318, filed Nov. 17, 2020, which is a continuation of U.S. application Ser. No. 16/897,466, filed Jun. 10, 2020, now U.S. Pat. No. 10,950,215, which is a continuation of U.S. application Ser. No. 16/583,882, filed Sep. 26, 2019, now U.S. Pat. No. 10,685,636, which is a continuation of U.S. application Ser. No. 14/601,854, filed Jan. 21, 2015, now abandoned, which is a continuation of U.S. application Ser. No. 12/599,026, filed Nov. 5, 2009, now U.S. Pat. No. 8,953,814, which is a 371 of International Application No. PCT/GB08/01601, filed May 8, 2008, which claims priority to UK Application No. 0708860.2, filed May 9, 2007, the entire disclosures of which are incorporated by reference in their entireties.

BACKGROUND OF THE INVENTION

The present invention relates to ambient noise-reduction systems for communications apparatus such as cellular phone handsets, walkie-talkies or the like, and it relates more especially to systems for handsets that are capable of being used both with and without listening devices such as earphones, headphones or headsets. That is, the user of the apparatus may choose, at any given time, to listen directly to the internal loudspeaker provided in the apparatus, or to listen using a wired or wireless listening device connected temporarily to the handset.

It has been proposed to provide ambient noise reduction in a cellular phone handset, by providing a signal processing device that receives a signal derived from detected ambient noise, and generates a sound that tends to cancel the effect of the ambient noise at the ear of the user.

It has now been recognized that, if ambient noise reduction is to be provided in a communications apparatus that can be listed to either directly by means of an internal loudspeaker or by means of a separate listening device, the ambient noise reduction must take account of the fact that the use of the separate listening device changes the sound environment, in terms both of the degree of exposure to ambient noise and of the noise-sensing and signal-processing approaches needed to reduce the ambient noise as perceived by the user.

SUMMARY OF THE INVENTION

According to a first aspect of the present invention, there is provided noise reduction circuitry, comprising:
a first input, for receiving signals from at least one first microphone;
a second input, for receiving signals from at least one second microphone; and
means for determining whether a second microphone is connected to the second input;
wherein the noise reduction circuitry is adapted to generate a noise cancellation signal by applying a first transfer function to the signals received from the first microphone when it is determined that no second microphone is connected to the second input;
and is adapted to generate a noise cancellation signal by applying a second transfer function to the signals received from the second microphone when it is determined that a second microphone is connected to the second input, wherein the second transfer function is different from the first transfer function.

According to a second aspect of the present invention, there is provided a communications apparatus, comprising:
at least one internal microphone, for detecting ambient noise around the apparatus;
an internal speaker, for generating a sound signal to be heard by a user of the apparatus;
means for receiving a listening device, the listening device comprising a listening device speaker and a listening device microphone, for detecting ambient noise around the listening device;
means for determining whether a listening device is connected to the apparatus; and
noise reduction circuitry, wherein the noise reduction circuitry comprises:
a first input, for receiving signals from the or each internal microphone;
a second input, for receiving signals from the listening device microphone; and
means for receiving a signal from the means for determining whether listening device is connected to the apparatus;
wherein the noise reduction circuitry is adapted to generate a noise cancellation signal by applying a first transfer function to the signals received from the internal microphone, and to apply the noise cancellation signal to the internal speaker, when it is determined that no listening device is connected to the apparatus;
and is adapted to generate a noise cancellation signal by applying a second transfer function to the signals received from the listening device microphone and to apply the noise cancellation signal to the listening device speaker, when it is determined that a listening device is connected to the apparatus, wherein the second transfer function is different from the first transfer function.

According to a third aspect of the present invention, there is provided a listening device, comprising means for identifying the listening device to a distinguishing device provided on a communications apparatus.

Thus, one embodiment of the invention can provide a cellular telephone handset provided with a loudspeaker means mounted internally thereof and further comprising an ambient noise-reduction system; wherein the said system comprises at least one local sound sensor means for sensing ambient noise received at said handset and for developing first electrical signals indicative of the sensed ambient noise, and signal processing means for operating upon said first electrical signals in accordance with a first processing mode to develop processed first signals for application to said internal loudspeaker means in a sense tending to reduce said ambient noise as perceived by a user of the handset; and wherein the handset further comprises receptor means adapted to removably receive a connector device for temporarily connecting said handset to at least one earphone or headphone having loudspeaker means directly associated therewith, connection sensor means for detecting the connection of said connector device to said receptor means and at least one further sound sensor means for sensing ambient noise received at said at least one earphone or headphone and for developing second electrical signals indicative of the ambient noise sensed by said further sound sensor means; the handset comprising means responsive to said detection by the connection sensor means for causing said processing means to operate upon said second electrical signals in accordance with a second processing mode, different from the first, to develop processed second signals for application to the loudspeaker means associated with said at least one earphone or headphone in a sense tending to reduce said ambient noise as perceived by a user of the handset with said at least one earphone or headphone.

In preferred embodiments of the invention, the signal processing means, whether operating in the first or the second mode, is provided by a processing unit within the handset.

In some preferred embodiments, the said processing unit comprises, or is incorporated within, a central processing unit (CPU) of the handset itself.

In other preferred embodiments, the said processing unit is separate from the handset CPU and comprises a dedicated integrated circuit (digital or analogue), or a discrete analogue circuit.

In still further preferred embodiments of the invention, the handset incorporates identifier means associated with the connection sensor means for distinguishing between at least two different types of earphone or headphone connectable to said handset, and further means for causing said processing means to operate upon second electrical signals provided to the handset in accordance with a processing mode dedicated to the type of earphone or headphone for the time being identified by said identifier means as being connected to said handset.

The identifier means preferably responds to a connector coding applied to earphones or headphones by their manufacturers.

Preferably, the connector coding comprises a digital numeric coding.

In some preferred embodiments, the handset comprises first and second relatively movable portions; the first portion presenting a keypad for use in operating the cellular telephone and a speech microphone into which the user may speak, and the second portion containing the internal loudspeaker means and the local sound sensor means.

In such embodiments it is preferred that the second portion further contains a screen to display operating information for said handset.

The second portion may be rendered movable in any convenient manner with respect to the first portion. In preferred embodiments, however, the first and second portions are hinged to one another ("clam-shell" style), to provide a "flip-up" configuration for the handset, or one portion is slidable with respect to the other to provide a "slider" configuration.

In any event, the local sound sensor means preferably comprises at least one ambient microphone disposed to receive ambient noise incident upon the handset. The ambient microphone is preferably mounted internally of said handset and provided with an inlet port through which said ambient noise can enter.

Further preferably, the siting and/or the configuration of said inlet port and/or of an acoustical conduit linking said port to said ambient microphone is adapted to render said ambient microphone preferentially sensitive to said ambient noise rather than the user's speech.

BRIEF DESCRIPTION OF THE DRAWINGS

In order that the invention may be clearly understood and readily carried into effect, certain embodiments thereof will now be described, by way of example only, with reference to the accompanying drawings of which.

DETAILED DESCRIPTION OF THE PREFERRED EMBODIMENTS

Existing ambient noise-reduction systems are based on one or the other of two entirely different basic systems, namely "feedback" and "feed-forward". These two systems are described in more detail in our UK patent application GB 2436657A.

Figure 1:
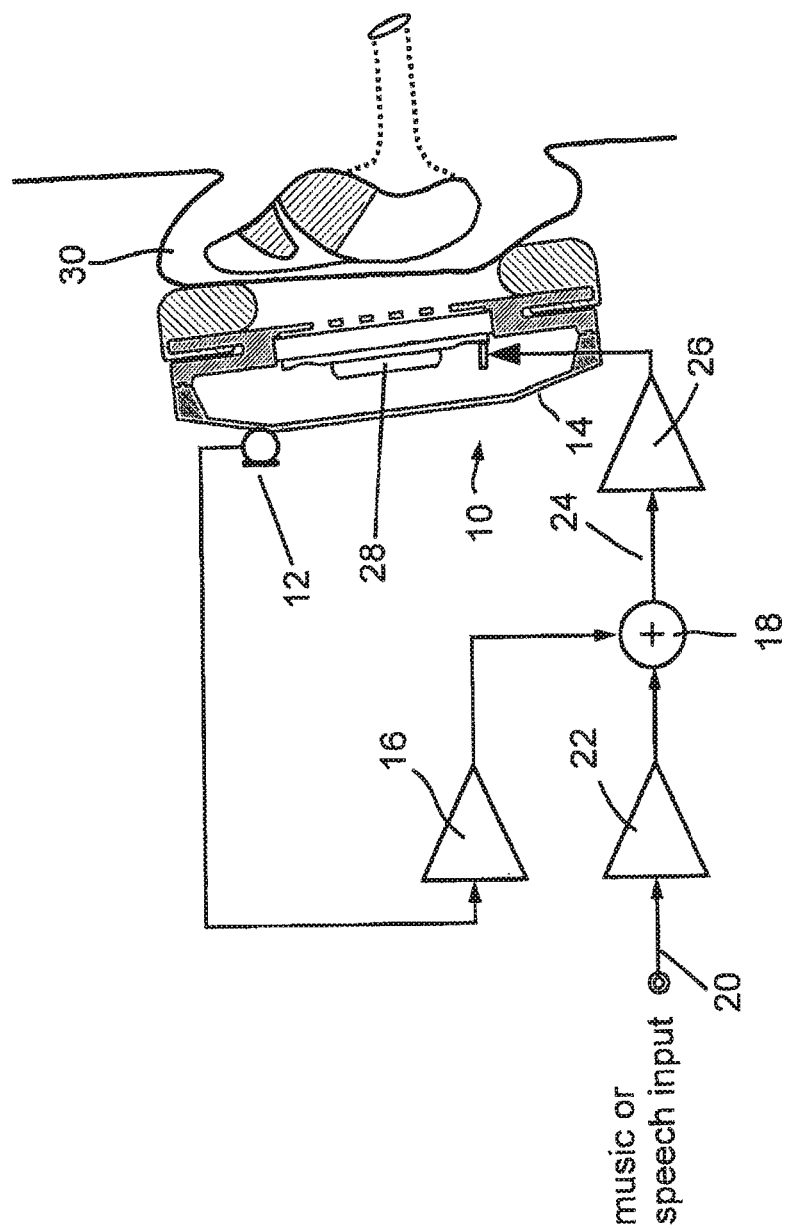
FIG. 1 shows a conventional ambient noise-reduction system, operating upon the feed-forward principle.

The present invention is applicable to both feedback and feed-forward noise-reduction systems, but will be described hereinafter in the feed-forward context, which is depicted in FIG. 1 in its most basic form, without any signal-processing. In the arrangement shown in FIG. 1, the ambient acoustic noise that occurs around an individual who is listening to a listening device in the form of an earphone, or headphone, (referred to hereafter as an "e/h phone") 10 is detected by at least one microphone 12 on, or inside, the housing 14 of the e/h phone 10. This signal is electronically inverted in a pre-amplifier and inverter circuit 16 and added, by means of an adding circuit 18, to the desired e/h phone drive signal (e.g. a music or speech signal which is input on line 20 and fed to adding circuit 18 by way of a buffer amplifier 22).

This creates a signal for application, via line 24 and a drive amplifier 26, to the loudspeaker 28 of the e/h phone 10. The drive signal applied to the loudspeaker 28 thus includes not only the desired drive component received on line 20, but also a noise reduction component which, ideally, once converted into an acoustical signal by the loudspeaker 28, is equal in magnitude, but opposite in polarity, to the direct incoming ambient acoustic noise signal, adjacent to the e/h phone loudspeaker outlet port within the cavity between the e/h phone shell 14 and the outer ear 30. Consequently, destructive wave interference occurs between the incoming acoustic noise and its inverse, generated via the loudspeaker 28 of the e/h phone 10, such that the ambient acoustic noise level perceived by the listener is reduced.

For effective feed-forward ambient noise-reduction, the frequency-dependent amplitude and phase characteristics of the generated acoustical reduction signal should closely match those of the incoming ambient noise signal at the eardrum of the listener. It has been found that surprisingly tight matching tolerances are needed for even relatively modest amounts of noise-reduction. For example, if a reduction of 65% (−9 dB) is to be achieved, then, assuming perfect phase matching, the amplitude of the generated acoustical reduction signal must be matched to that of the incoming ambient noise signal within ±3 dB. Similarly, even if the amplitudes are perfectly matched, the relative phase of the signals must lie within ±20° (0.35 radian).

However, although the external ambient noise signal is the common source of both the directly incoming noise signal at the ear and its synthesised noise-reduction counterpart supplied by way of components 12, 16, 18, 26 and 28, both of these signals are modified considerably and differently by their respective acoustical and electrical pathways to the eardrum. Provided that these differences are not excessive, it is possible to introduce electronic signal-processing, to compensate for the differences and re-align the amplitude and phase characteristics of the (synthesised) reduction signal sufficiently with those of the incoming ambient noise signal. This signal-processing is conveniently introduced as a serial stage 32 in the electronic pathway from the one or more external microphones 12 to the e/h phone loudspeaker 28, as shown in FIGS. 2 and 3, wherein features common to FIG. 1 carry the same reference numbers.

Figure 2:
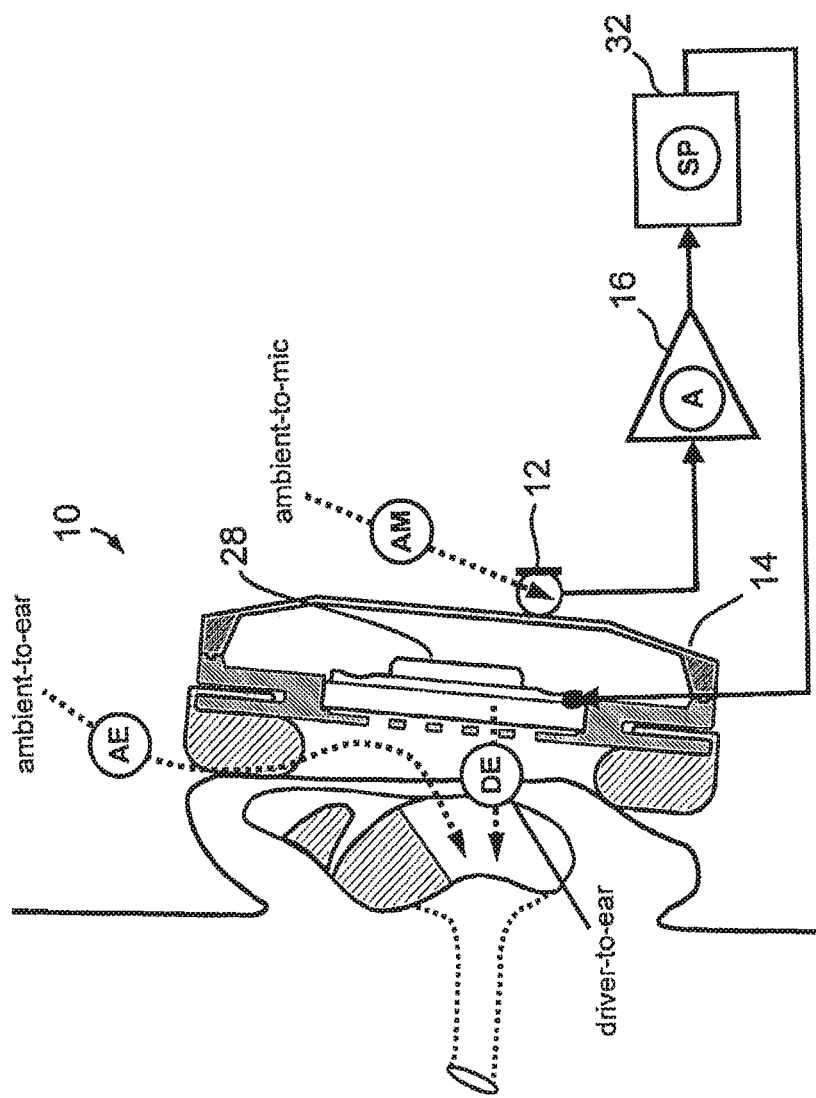
FIG. 2 shows schematically the primary feed-forward transfer functions.
Figure 3:
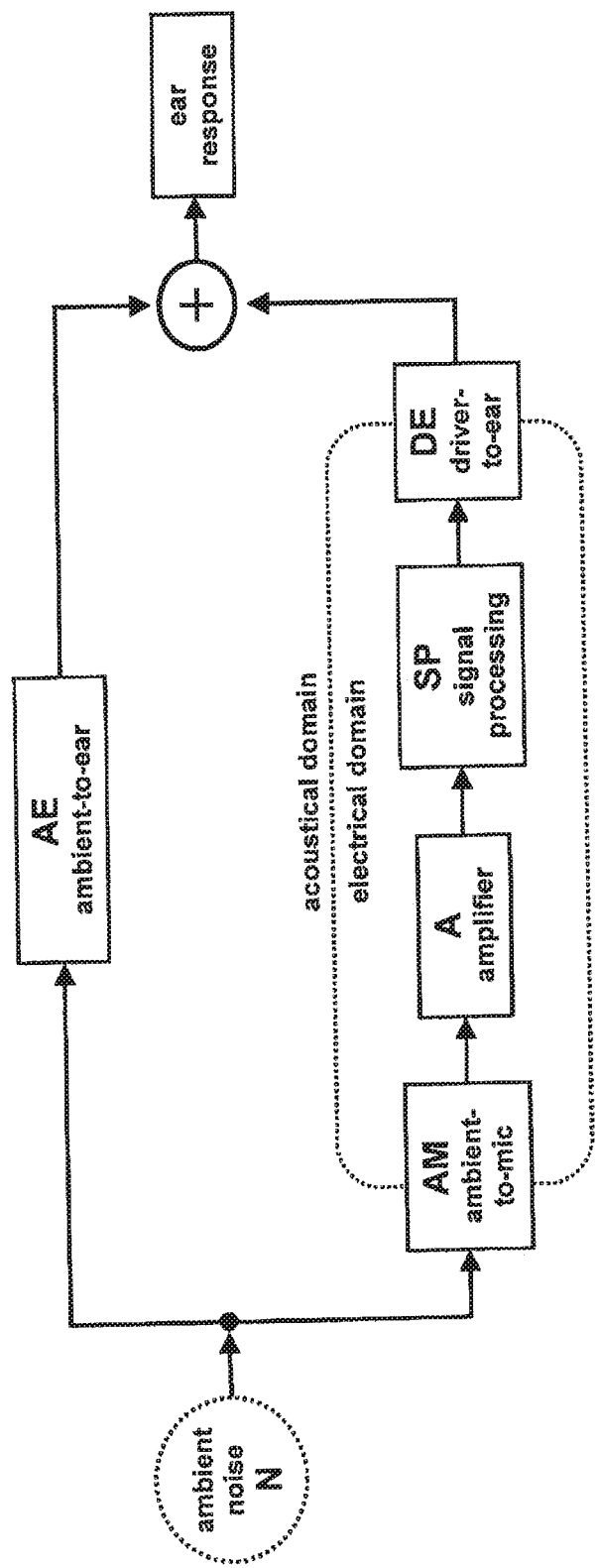
FIG. 3 is a block diagram illustrating feed-forward signal connectivity, including a signal processing stage.

These various primary signal pathways are depicted physically in FIG. 2, and in block schematic form in FIG. 3. Each signal pathway has a respective transfer function comprising both a frequency-dependent amplitude characteristic and an associated frequency-dependent phase characteristic. There are four of these primary transfer functions, as follows.

1: Ambient-to-Ear [AE]

This represents the acoustical leakage pathway by which external ambient noise signals reach the ear, and includes transmission around and through the ear-pad and e/h phone casing 14.

2: Ambient-to-Microphone(s) [AM]

This represents the acoustoelectric response of the external microphone (or microphones) 12 as deployed in their operational mode, which includes local acoustical effects (for example, of the listener's head).

3: Driver-to-Ear [DE]

This represents the electroacoustical couple between the e/h phone's driver unit (a small, high-compliance loudspeaker 28) and the eardrum of the listener. This is strongly influenced by the nature of the acoustical load that it drives, a key feature of which is the acoustical leakage pathway (item 1, above) between the driver-to-ear cavity and the external ambient.

4: Electronic Amplification [A]

This is the electrical transfer function of the amplifier 16. Although it is commonplace to provide an amplifier having a "flat" (i.e. relatively constant) amplitude characteristic as a function of frequency, it is usually necessary or convenient in practice to incorporate one or more AC coupling stages, and these behave as first-order low-cut (high-pass) filters. It is important to take account of this.

Knowledge of these transfer functions allows the desired signal processing transfer function to be derived. Specifically, the signal processing transfer function should be such that the product of the Ambient-to-Microphone(s), the electrical transfer function of the amplifier, the signal processing transfer function, and the Driver-to-Ear transfer function is equal to the inverse of the Ambient-to-Ear transfer function.

Although FIG. 2 shows the sound reaching the ear of the listener through an earphone, it will be apparent that the same principle applies to the case where the user is listening through a communications apparatus such as a cellular phone handset, or a walkie-talkie, or the like.

However, it will also be appreciated from the foregoing that the transfer functions defined above, and thus the signal processing which they demand, will differ significantly between, on the one hand, a situation in which a user listens directly to the in-built loudspeaker of a cell-phone handset and, on the other hand, a situation in which the user listens through e/h phones. The present invention addresses that issue, based on the recognition of the tight matching tolerances that are needed for successful noise reduction.

It is also the case that the derived signal-processing characteristics, being critically dependent on the specific acoustical and electrical properties of each different e/h phone type, are specific to each particular e/h phone system. Different e/h phone types thus ideally require different signal processing parameters, and some embodiments of the invention address that issue too.

The present invention thus provides, in one embodiment now to be described, noise reduction circuitry for an apparatus such a cellular phone handset, with means for switching automatically between two distinct modes of operation—an "Internal" mode and an "External" mode—such that ambient noise-reduction can be provided via transducer means that are either internal to the handset, or which (as when using e/h phones) are provided separately and are external to the handset, with the necessary noise-reduction signal processing in each case being provided. This noise reduction circuitry can be provided either in the central processing unit (CPU) of the handset itself, or, preferably, as a separate, dedicated integrated circuit (digital or analogue), or a discrete analogue circuit.

As described earlier, recent improvements in multiple-microphone and signal-processing technology now enable ambient noise-reduction to be incorporated into a cellular phone handset such that ambient noise reduction at the ear of the listener can be achieved. An example of this was disclosed for example in our aforementioned UK patent application No. GB 2436657; FIG. 14 of which shows a handset featuring a triple microphone array. A two-microphone version of this is shown (by way of example only) in FIGS. 4 to 7 hereof, to which reference will now be made.

Figure 4:
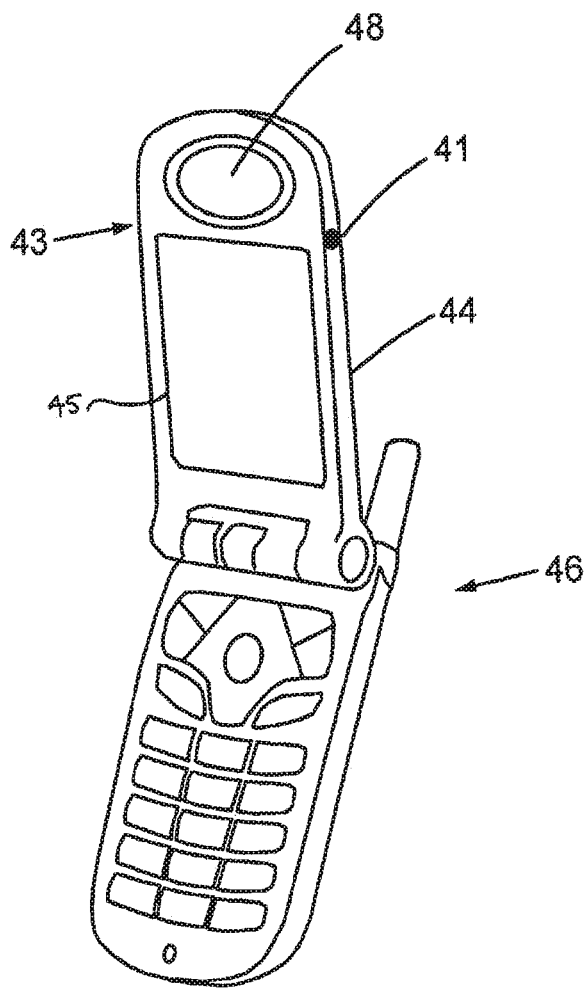
FIG. 4 shows a cellular phone construction with a twin-microphone ambient sound sensor means.

In this example, the microphones 40 and 42 (see FIGS. 5 to 7) are internally mounted in the handset, and communicate with the ambient environment by way of respective inlet ports, one of which is shown at 41 in FIG. 4; the site of the inlet port for the other microphone being indicated by the arrow 43. Thus it will be appreciated that the inlet ports are symmetrically sited on opposite sides of a "flip-up" portion 44 of the hand set 46.

A display screen 45 is also provided on the "flip-up" portion 44 of the hand set 46.

Although FIG. 4 shows one example of possible positions for the microphone inlet ports 41, 43, other siting arrangements may be made for the inlet ports if desired, however, and moreover active surfaces of the microphones 40 and 42 may be directly exposed at a surface of the handset if desired.

In any event it is preferred that the siting of the microphones 40 and 42, and/or the siting and configuration of any inlet ports and/or acoustical conduits linking inlet ports to the microphones are designed to render the microphones 40 and 42 preferentially sensitive to ambient noise rather than the user's speech.

The two microphones, 40 and 42 are thus arranged to generate a signal representative of the ambient noise incoming to the ear of the user. From that signal, a noise-reduction signal is generated and transmitted from the microspeaker outlet port 48, held close to the ear of the user, thus affording a degree of active noise-reduction.

Figure 5:
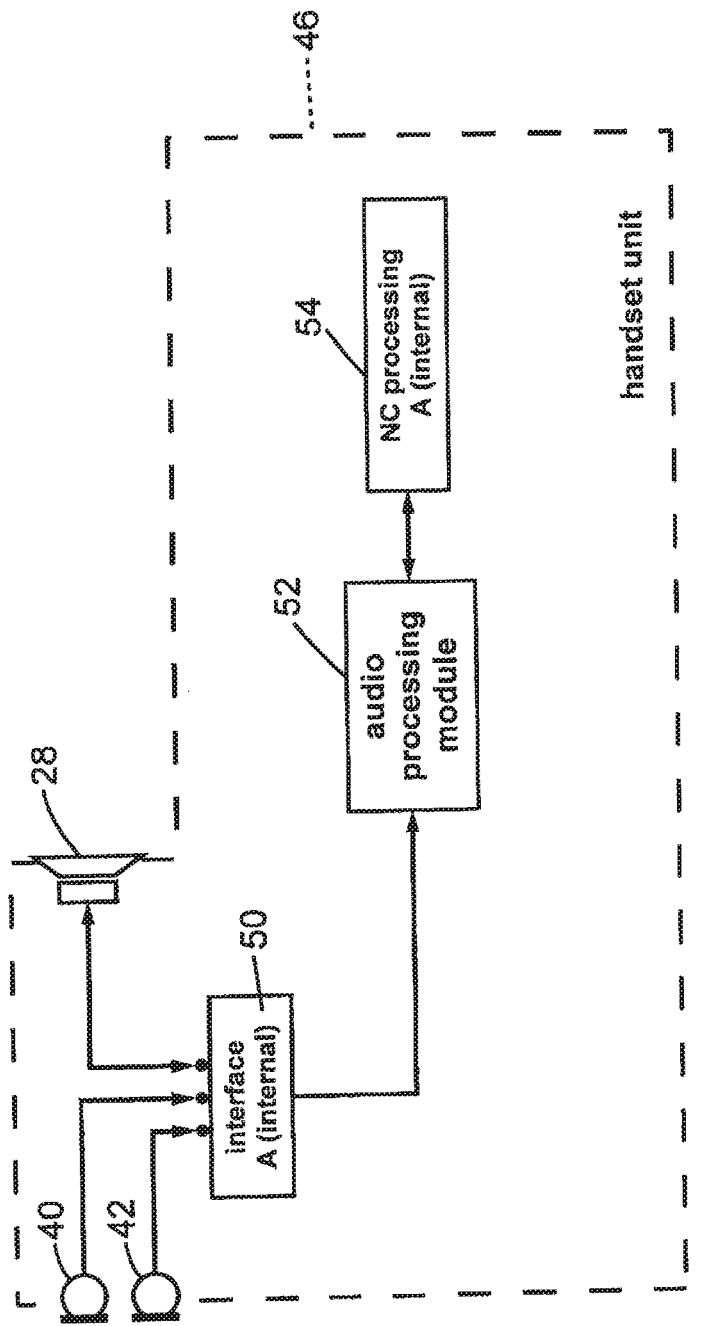
FIG. 5 shows an internal noise-reduction scheme for the construction of FIG. 4.

This configuration is shown in block diagrammatic form in FIG. 5, in which signals from the two microphones 40 and 42 on the "flip-up" portion 44 of the handset 46 feed into an interface "A" module 50 which contains the necessary microphone-biasing voltage sources and buffer pre-amplifiers for amplifying the low-level microphone signals such that they are suitable for driving into subsequent signal-processing stages. Interface "A" module 50 also contains a drive amplifier suitable for driving the handset microspeaker 28 (sometimes termed "receiver") adjacent the outlet port 48 which of course, in use, is held close to the user's ear.

In use, the signals from microphones 40 and 42 are fed via the interface "A" module 50 into an audio processing module 52 that is capable, under the influence of a controller 54, of implementing various signal-processing tasks, such as high- and low-pass filtering, band-pass filtering, level control and the like. The audio processing module 52 and controller 54 are incorporated within the handset 44, and can be provided within the central processing unit (CPU) of the handset, or may for example be provided as a separate, dedicated integrated-circuit (digital or analogue), or as a discrete analogue circuit. After appropriate signal-processing, the noise-reduction signal is fed to the internal loudspeaker 28 via the "A" interface 50, thereby generating an acoustic noise-reduction signal at the ear of the user. This mode of operation can conveniently be termed the "internal" mode of operation.

Cell-phone handsets are, as has been said, often used with e/h phones, such as in-ear phones, (so-called "ear-buds"), either for reasons of privacy or for better signal-to-noise performance, or as part of a "hands-free" arrangement, and, as explained previously, it is an aim of the invention to provide ambient noise-reduction for these situations, too. Although it is possible to obtain self-contained noise-reducing ear-bud type earphones, these require their own battery supply and electronic circuitry, thus incurring additional expense for the user, and being bulkier, heavier and less convenient in use. It is therefore advantageous to integrate the noise-reduction signal-processing into the handset unit, using the handset's power supply. This is less bulky, less expensive and much more convenient for the user, and simply requires that the ear-buds each bear an integral microphone with suitable connection means.

However, the signal-processing characteristics are critically dependent on the acoustic properties of the ear-bud (or other e/h phone) arrangements, and these parameters very greatly. Different signal-processing schemes are required for the internal mode (FIG. 5) and for ear-bud (or other e/h phone) use (external mode). Indeed, different types of ear-buds (or other e/h phones), having differences in their internal acoustical properties owing to differences in their internal volumes, driver units and acoustical leakages, require different electronic signal-processing schemes, featuring different filter characteristics.

This example of the invention provides a communications apparatus in the form of a cellular phone handset, which includes automatic switching means for detecting the use of external ear-buds, and for switching the noise-reduction configuration either to an external mode, when the ear-buds are in use, or to an internal mode, when the ear-buds are not in use (i.e. when they are unplugged). This embodiment of the invention also provides for detecting and identifying a variety of different types of external ear-bud, and for automatically switching the signal-processing into to an appropriate configuration according to pre-stored filter characteristics associated with a range of ear-bud types. Thus a given manufacturer's handset can be used with a range of ear-buds, including those made by other manufacturers, and the user is thereby not restricted to a single ear-bud type.

Figure 6:
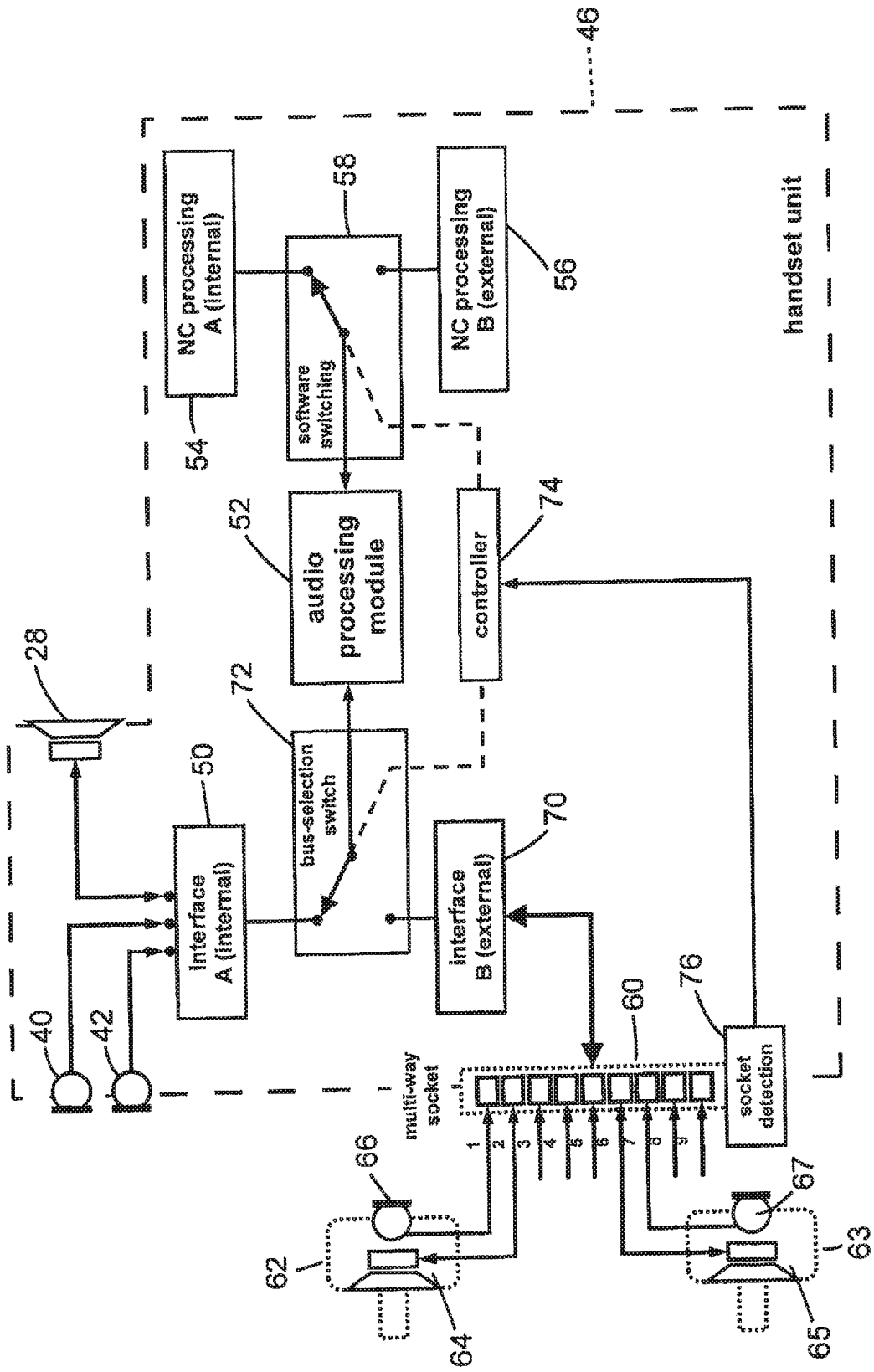
FIG. 6 shows, in block-diagrammatic form, a cellular phone handset in accordance with one embodiment of the invention.

FIG. 6 shows a simplified block diagram of such a switching configuration, in which, for clarity, the individual signal pathways are shown, rather than all of the individual electrical connections; for example, the microphone and loudspeaker connections are shown as single, signal pathways rather than electrical pairs. It can be seen that the integral microphones 40 and 42 and loudspeaker 28 of the handset 46 are still connected via "A" interface 50 (internal mode). In addition, there is now provided an external receptor 60, fitted with connector detection means 76, into which external e/h phones comprising, in this example, ear-buds 62, 63 can be plugged, said ear-buds each containing a respective microspeaker 64, 65, and a respective integral microphone 66, 67, for detecting ambient noise. The external receptor 60 is connected to interface "B" 70 (external mode), which contains the necessary microphone-biasing voltage sources and buffer pre-amplifiers for amplifying the low-level signals from microphones 66 and 67, such that they are suitable for driving into subsequent signal-processing stages. Interface "B" module 70 also contains a two-channel drive amplifier suitable for driving the ear-bud microspeakers 64 and 65.

Interfaces "A" 50 and "B" 70 are both connected via a bus-selection switch 72 to the audio processing module 52, such that the latter receives signals from, and transmits signals to, either the internal or external transducers, determined by control means 74 which is connected to the external connector-detection means 76, such that when an ear-bud connector is inserted into receptor 60, then interface "B" (external mode) 70 is selected, and when no connector is inserted into receptor 60, the system reverts to select interface "A" (internal mode) 50. The processing implemented by the module 52 is determined either by the internal processing controller 54 or an external processing controller 56, depending upon the control exerted by control means 74 upon a software switching system 58; the setting of control means 74 in turn being determined by whether or not the external connector 60 is being used to support connections to e/h phones such as 62, 63. It will thus be appreciated that different noise-reduction processing is implemented automatically, depending upon whether the user is employing the internal speaker 28 of the handset 46, or is instead using external e/h phones 62, 63.

The plug-detection means 76 can be implemented in various ways, but one convenient technique involves the provision of a connector pin in the receptor 60, which can be conveniently configured as a handset multi-way socket; the connector pin being connected to a "pull-up" resistor (i.e. biased to a power supply voltage source via a current-limiting resistor), and arranging that a corresponding conductor in a multi-way plug connector, adapted for insertion into the multi-way socket of receptor 60, is connected to electrical ground, such that when the plug is inserted into the multi-way socket, the voltage on the connector pin becomes "low" (0 V), rather than its default "high" value (the power supply voltage). This voltage change is then detected by the controller module, which then: (a) selects the appropriate (internal or external) interface for connection to the audio processing module; and (b) selects the appropriate signal-processing scheme. The latter can be implemented either as a software switch, where a digital signal-processing means is provided, or as a hardware switch or switches, where an analogue signal-processing scheme is used.

FIG. 6 shows the noise reduction circuitry having the interface "A" 50, the interface "B" 70, the audio processing module 52, the internal processing controller 54, the external processing controller 56, the software switching system 58, the bus-selection switch 72, and the control means 74 as separate components. However, some or all of these components can conveniently be provided in a single integrated circuit. For example, the noise reduction circuitry can be provided in the form of an integrated circuit with a first input, for connection to the microphones 40, 42, and a corresponding output for connection to the speaker 28; and a second input, for connection to the microphones 66, 67, and a corresponding output for the speakers 64, 65. The integrated circuit can then receive an input, for example from the socket detection block 76, for determining whether a microphone is connected to the second input.

In this case, the noise reduction circuitry is adapted to generate a noise cancellation signal by applying a first transfer function to the signals received from the first input when it is determined that no microphone is connected to the second input, and is adapted to generate a noise cancellation signal by applying a second transfer function to the signals received from the microphone connected to the second input when it is determined that such a second microphone is connected to the second input. The second transfer function is different from the first transfer function.

As described above, it is also advantageous (though not essential) to provide the option to cope with a variety of differing ear-bud or other e/h phone types. The signal-processing characteristics for a range of differing e/h phone types can be stored as preset parameters within the handset, such that the actual type of e/h phone in use can be identified mechanically and/or electronically and the appropriate signal-processing parameters selected for use with them.

Figure 7:
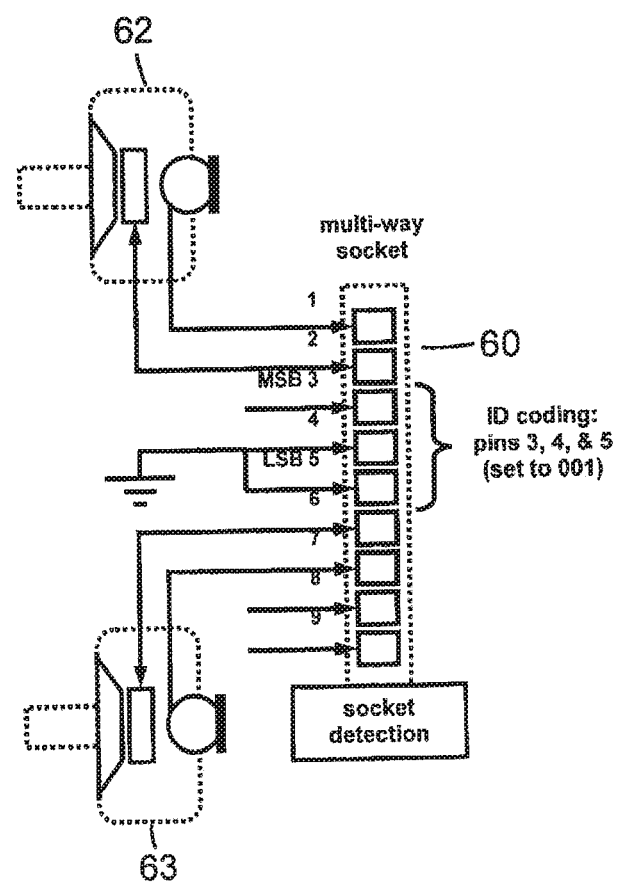
FIG. 7 shows an identification coding technique for permitting different noise-reduction protocols to be used with different listening devices.

Such an identification procedure is shown in FIG. 7, which depicts a pair of noise-reducing ear-buds 62, 63, each bearing a microspeaker 64, 65 respectively, and a microphone 66, 67 respectively, and which is shown plugged in to the multi-way socket comprising connector 60 of the handset 46. The identification is, in this example, achieved by providing several dedicated conductors to serve as a digital binary coding byte, in which the individual conductors are connected to ground according to their code number, and used with a "pull-up" detection arrangement similar to that described above.

For example, pins 3, 4 and 5 of connector 60 serve this function in the arrangement of FIG. 7, in which pin 3 represents the most significant bit (MSB) and pin 5 represents the least significant bit (LSB) of a 3-bit binary word. It is shown that pins 4 and 5 are grounded, thus corresponding to the decimal number 4 (binary 100), and hence when this plug is inserted into the connector 60, the controller means selects External mode, and also the signal processing scheme for ear-bud Type 4 (of 8). The default ear-bud processing scheme is initially set to be that of the ear-buds which are supplied with the handset, but can be reset to another choice by the user.

In this illustrated embodiment, the identification mechanism allows the ear-buds to be identified by a distinguishing device provided on a cellular phone handset. However, the same mechanism would allow the ear-buds, or other listening device, to be identified by any apparatus (for example, a portable music player) to which they are connected.

The identification mechanism may identify the listening device as a particular model, or may identify the listening device less precisely, for example as a member of a group of listening devices having particular characteristics that require a particular noise reduction transfer function.

As an alternative, the signal processing scheme may be user selectable or user adjustable. In this case, a user interface may be provided by means of the display screen 45, allowing the user to select a desired input by means of keys or via a touch screen, or in any other convenient way. Thus, when using a listening device, in the form of headphones, earphones or earbuds, or the like, which may be connected by means of a plug and socket arrangement or via a short-range wireless connection such as Bluetooth or another such protocol, the user may select a suitable noise reduction transfer function. The user may be able to select one available noise reduction transfer function that differs from the noise reduction transfer function that has been designed for use with the microphone(s) and speaker(s) of the handset apparatus itself. Alternatively, the user may be able to select from multiple available noise reduction transfer functions, each of which is suitable for use with a particular model or class of listening device.

Additional user enhancements can be used in conjunction with the switching scheme, as have been disclosed previously, including the use of user-selectable noise-reduction transfer functions, for use in different ambient noise conditions, such as on a train, or on an aeroplane. Moreover, the ambient noise-reduction effect may be faded up and down according to various external stimuli, as described in GB 2436657, such as excessive ambient noise (above a threshold level), the detection of music playback, and also physical head-movement of the listener. A valuable enhancement for cell-phone usage is the incorporation of noise-reduction level management triggered by an incoming telephone call, such that if, during music playback via ear-buds with ambient noise-reduction switched on, an incoming call occurs, it triggers a sequence in which the noise-reduction fades down so as to make the user more aware of the external world, thus contributing to the alerting function.

Further, the noise reduction transfer function may be adjustable by the user. For example, it is known that components such as microphones and speakers in apparatus such as cellular phone handsets have relatively wide tolerances, and thus the optimum noise reduction transfer function can vary quite markedly from one apparatus to another. In order to provide the best possible noise reduction performance for such apparatus, the user interface described above may allow the user to select or adjust a noise reduction transfer function.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A system comprising:
   a host device; and
   a listening device that is wirelessly couplable to the host device,
   wherein the system comprises:
   noise reduction circuitry configured for generating a noise cancellation signal,
   and wherein the system is configured to adjust a level of the noise cancellation signal in response to occurrence of a system event during audio playback via the listening device with noise cancellation switched on, wherein a system event comprises an event arising within the system that causes the system to generate an alert for alerting a user of the system.

2. A system according to claim 1, wherein the system is configured to reduce the level of the noise cancellation signal in response to the system event.

3. A system according to claim 1, wherein the noise reduction circuitry is configured to apply a noise reduction transfer function to a signal generated by a microphone of the listening device.

4. A system according to claim 1, wherein the host device comprises an audio processing module.

5. A system according to claim 4, wherein the audio processing module is configured to act as a source of a desired drive signal to be applied to a loudspeaker of the listening device.

6. A system according to claim 1, wherein the noise reduction circuitry is provided in the host device.

7. A system according to claim 1, wherein the host device is a communications apparatus.

8. A system according to claim 7, wherein the host device is a mobile phone handset.

9. A system according to claim 7, wherein the system event is an incoming call to the host device.

10. A system according to claim 1, wherein the listening device comprises a pair of ear buds, each comprising at least one first microphone and at least one first loudspeaker.

\* \* \* \* \*